US009623565B2

(12) United States Patent
Hung et al.

(10) Patent No.: US 9,623,565 B2
(45) Date of Patent: Apr. 18, 2017

(54) STATE DETECTING METHOD, ROBOT AND MOBILE DEVICE

(71) Applicant: MSI Computer(Shenzhen)Co., Ltd., Shenzhen (CN)

(72) Inventors: Shih-Che Hung, New Taipei (TW); Yuan-Chen Chen, New Taipei (TW); Pi-Chang Jung, New Taipei (TW)

(73) Assignee: MSI COMPUTER(SHENZHEN)CO., LTD., Shenzhen (CN)

( * ) Notice: Subject to any disclaimer, the term of this patent is extended or adjusted under 35 U.S.C. 154(b) by 116 days.

(21) Appl. No.: 14/657,503

(22) Filed: Mar. 13, 2015

(65) Prior Publication Data

US 2016/0158941 A1    Jun. 9, 2016

(30) Foreign Application Priority Data

Dec. 4, 2014    (TW) .............................. 103142261 A

(51) Int. Cl.
| | | |
|---|---|---|
| *B25J 9/16* | (2006.01) | |
| *B25J 5/00* | (2006.01) | |
| *B25J 11/00* | (2006.01) | |
| *G05D 1/02* | (2006.01) | |

(52) U.S. Cl.
CPC .............. *B25J 9/1694* (2013.01); *B25J 5/00* (2013.01); *B25J 9/1674* (2013.01); *B25J 11/0085* (2013.01); *G05D 1/0242* (2013.01); *A47L 2201/04* (2013.01); *G05D 2201/0215* (2013.01); *Y10S 901/01* (2013.01)

(58) Field of Classification Search
CPC ...... B25J 9/1694; B25J 9/1674; B25J 9/1676; B25J 9/1664; B25J 9/1666; B25J 5/00; B25J 11/0085; G05D 1/0242
See application file for complete search history.

(56) References Cited

U.S. PATENT DOCUMENTS

| | | | | |
|---|---|---|---|---|
| 7,332,890 | B2 * | 2/2008 | Cohen ................... | A47L 9/2857 320/109 |
| 7,388,343 | B2 * | 6/2008 | Jones .................... | G05D 1/0219 318/568.12 |
| 7,402,974 | B2 * | 7/2008 | Jeon ....................... | G05D 1/021 180/65.1 |

* cited by examiner

*Primary Examiner* — Adam Mott
(74) *Attorney, Agent, or Firm* — Muncy, Geissler, Olds & Lowe, P.C.

(57) ABSTRACT

A state detecting method applied to a mobile device includes: arranging a depth sensor at the bottom of the mobile device, obtaining a detection signal of the depth sensor, and determining if the mobile device is in a lifted state, a tilted state, or an edge-bordering state, based on the numerical value of the detection signal of the depth sensor. The lifted state is associated with the mobile device without contacting with a support surface. The tilted status is associated with one end of the mobile device contacting the support surface and the other end of the mobile device without contacting the support surface. The edge-bordering state is associated with the mobile device located at the edge of the support surface. Accordingly, when the mobile device is in any of the aforementioned states, an appropriate response can be implemented.

9 Claims, 12 Drawing Sheets

STATE DETECTING METHOD, ROBOT AND MOBILE DEVICE

CROSS-REFERENCES TO RELATED APPLICATIONS

This non-provisional application claims priority under 35 U.S.C. §119(a) on Patent Application No. 103142261 filed in Taiwan, R.O.C. on Apr. 12, 2014, the entire contents of which are hereby incorporated by reference.

BACKGROUND

Technical Field

The instant disclosure relates to a robot, in particular, to a robot with state-detection ability, a mobile device, and a state detecting method.

Related Art

With the advancement in technology, robots are being widely used in today's modern day life. Some examples include robotic arms, security robots, broom-sweeping robots, etc. Robots can perform precise operations, repeat routine tasks, and help humans with basic chores such as broom-sweeping robots. One type of broom-sweeping robots is self-propelled robot vacuum. This robot vacuum is applicable for home cleaning. When people are sleeping at night or out for work during the day, the robot vacuum can move around the house and clean up dusts, particles, etc. Hence, the residents are saved from cleaning the house room-by-room tediously.

The self-guided robots are often deployed with obstacle detectors. For instance, an infrared emitter emits infrared in a forward direction. When the infrared is reflected by a forwardly standing obstacle and received by the infrared receiver equipped on the robot, the robot can determine whether an obstacle exists in the path. However, aside from detecting obstacles to prevent from hitting the robots, the robots may stick or flip over due to uneven ground geometry or steep slopes, thus causing work interruption. Another issue is if a child is present, the child may be curious enough to lift up the robot. If the robot is not stopped from its operation in time, the situation could cause injury to the child.

SUMMARY

In light of above, the instant disclosure provides a state detection method applicable for mobile devices, such as robots, cellular phones, electric charging stations, and other movable devices. First, the mobile device is furnished with a depth sensor on an inner side thereof. After a depth sensing signal is obtained, based on the numerical value of the signal, the mobile device is determined to be in a lifted state, a tilted state, or an edge-bordering state. The lifted state is defined as without touching the support surface. The tilted state is defined as one end touching the support surface, while another end is without touching the support surface. The edge-bordering state is defined as being at the edge of the support surface. Therefore, when the mobile device is in any of the above-mentioned states, a response procedure can be implemented.

In one embodiment, the response procedure implements immediate or gradual change of the motion for the mobile device (such as non-linear or linear stop, turnaround, linear or non-linear back up, etc). The response procedure prevents the mobile device from continuing its original motion or remaining in the original state. In another embodiment, the response procedure issues a warning. The warning could be sent out continuously until it is lifted or lifted automatically after a time duration. The warning reminds the user to make the mobile device exiting any of the above-mentioned states.

In yet another embodiment, the response procedure makes the mobile device to return to the original position or starting location. Alternatively, the mobile device is made to return to a previous state. After the mobile device has reached the previous state, the mobile device can change its current state proactively or passively.

In some embodiments, based on at least one depth sensing signal, the moving direction of the mobile device and its travelled distance can be obtained via the state detection method. The obtained data is further used to retrieve the travelling path of the mobile device. Therefore, based on the travelling path, the mobile device can be returned to its original position or starting location.

In further yet another embodiment, a multiplicity of depth sensors is employed. When the signal changes of all sensors surpass a first threshold value, the mobile device is determined to be in the lifted state. If the signal changes of some sensors surpass a second threshold value, while the sensor signals of all other sensors do not change, the mobile device is determined to be in the tilted state. Meanwhile, if the signal changes of some sensors surpass a third threshold value, while the sensor signals of all other sensors do not change, the mobile device is determined to be in the edge-bordering state.

In one embodiment, the state detection method further includes disposing a shield in front of the depth sensor, along with detecting the sensor signal. When the numerical value of the sensor signal is zero, the mobile device is determined to be in a collision state.

The instant disclosure also provides a robot. The robot comprises a main body, a moving unit, at least one depth sensor, and a control module. The moving unit and the depth sensor are arranged on one side of the main body. The control module is electrically connected to the moving unit and the depth sensor. Based on the numerical value of the sensor signal, the control module determines whether the robot is in the lifted state, the tilted state, or the edge-bordering state. The lifted state is defined as the robot not touching a support surface. The tilted state is defined as one end of the robot touching the support surface, while another end thereof is not touching the support surface. The edge-bordering state is defined as the robot being adjacent to the edge of the support surface. Therefore, when the robot is in any of the above-mentioned states, the afore-mentioned response procedure can be implemented.

The instant disclosure further provides a mobile device. The mobile device comprises a main body, at least one depth sensor, and a control module. The depth sensor is arranged on one side of the main body, and the control module is electrically connected to the depth sensor. Based on the numerical value of the sensor signal, the control module determines whether the mobile device is in the lifted state, the tilted state, or the edge-bordering state. The lifted state is defined as the mobile device without touching a support surface. The tilted state is defined as one end of the mobile device touching the support surface, while another end thereof does not touch the support surface. The edge-bordering state is defined as the mobile device being adjacent to the edge of the support surface.

Based on the above, the state detection method, the robot, and the mobile device disclosed by the instant disclosure utilize the depth sensor to identify the state (lifted, tilted, collision, or edge-bearing) of the robot or the mobile device.

None of the other instruments are needed. When any of the four above-mentioned states is identified, the appropriate response procedure is triggered to restrict the motion of the robot/mobile device, or to change the internal state or procedure of the system.

DETAILED DESCRIPTION

Figure 1:
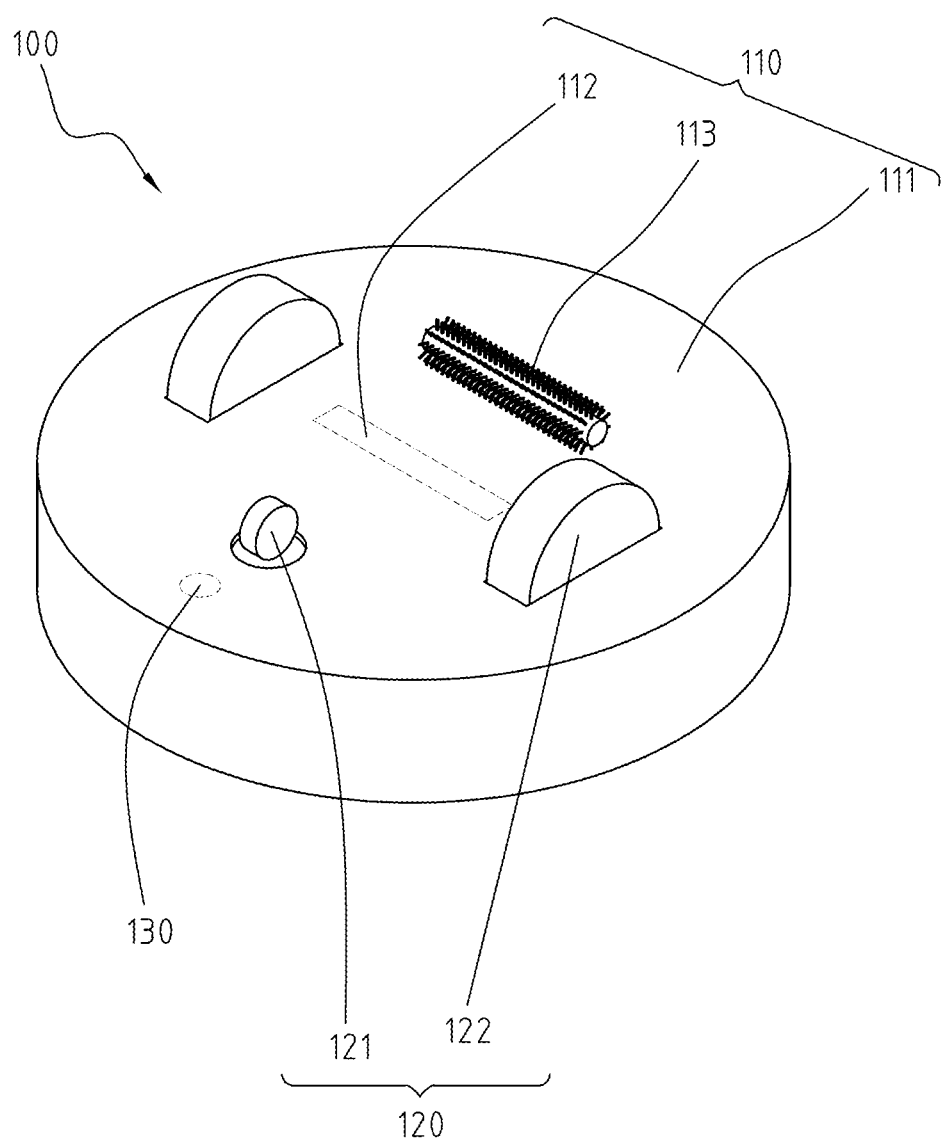
FIG. 1 is a perspective view of a robot for a first embodiment of the instant disclosure.
Figure 3:
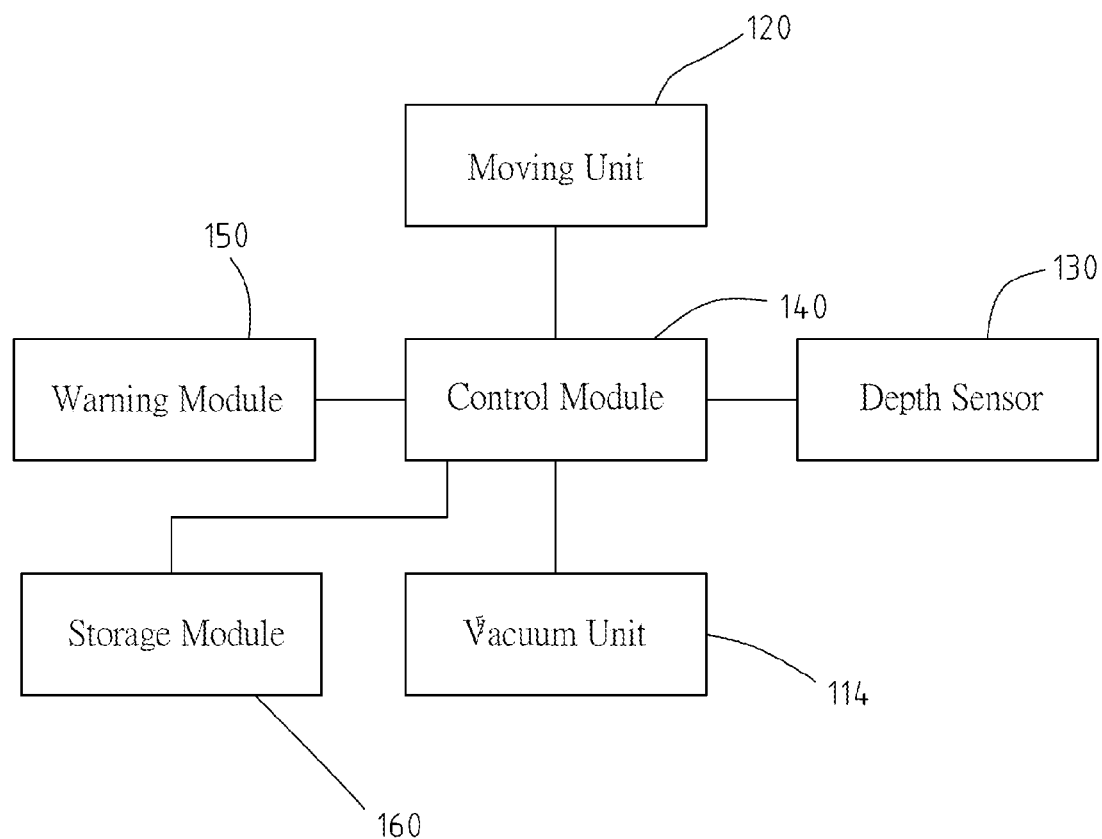
FIG. 3 is a block diagram of the robot in FIG. 1.

Please refer to FIG. 1, which shows a perspective view of a robot 100 for a first embodiment of the instant disclosure. The robot 100 comprises a main body 110, a moving unit 120, and at least one depth sensor 130. For the present embodiment, the robot 100 is for broom-sweeping purpose. The main body 110 includes a casing 111, a vacuum opening 112 formed on the casing 111, a brush 113, and a vacuum unit 114 (as shown in FIG. 3). In other embodiments, the robot 100 may serve other purposes with the main body 110 having the casing 111, but including other accessories (e.g. video camera, robotic arm, etc.). The selection of accessories is based on desired capabilities of the robot, which does not necessarily need to have aforementioned vacuum opening 112, brush 113, and the vacuum unit 114.

As shown in FIG. 1, the vacuum opening 112 and the brush 113 are formed and disposed, respectively, on the bottom portion of the casing 111. The vacuum unit 114 is disposed internally of the casing 111. The vacuum unit 114 may include a motor, a dust bag, a filter, etc. The moving unit 120 is disposed on the bottom portion of the main body 110. The depth sensor 130 is arranged on one side of the casing 111 (the depth sensor 130 is disposed internally of the casing 111 but adjacent to the bottom portion thereof and partially exposed from the bottom portion thereof). Detection away from the robot 100 is made by the depth sensor 130. The moving unit 120 includes a swivel wheel 121, a pair of fixed wheels 122, and a drive motor (not shown). The depth sensor 130 can be an infrared sensor, an ultrasonic sensor, a static sensor, or other non-contact type distance sensor.

Figure 2:
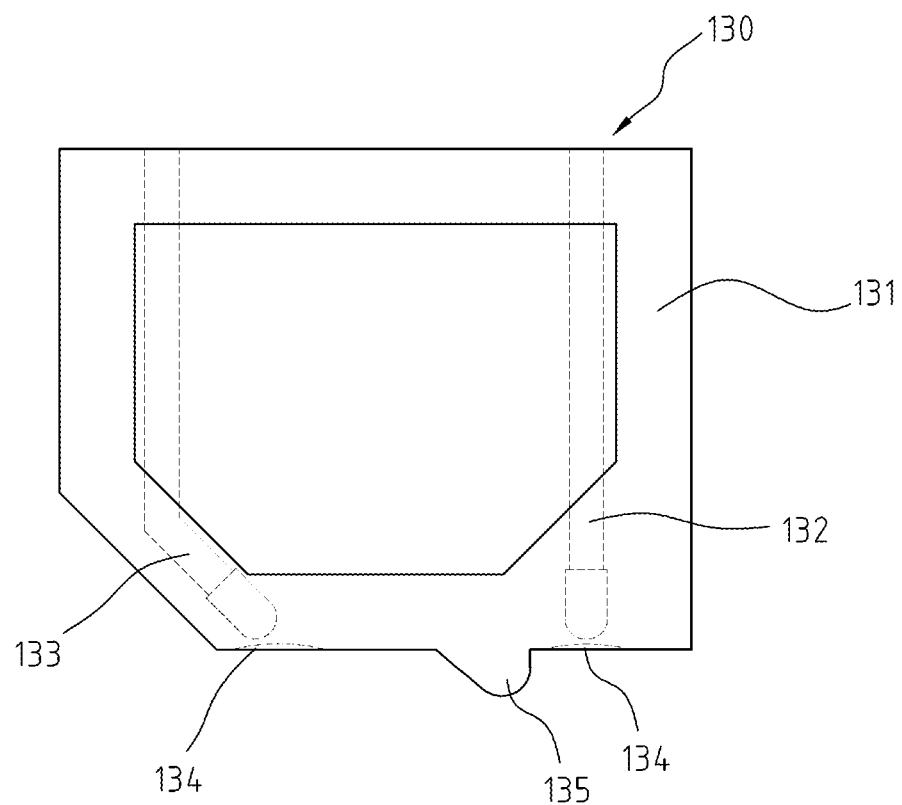
FIG. 2 is a schematic view of a depth sensor for the first embodiment of the instant disclosure.

Please refer to FIG. 2, which shows the depth sensor 130. For the present embodiment, the depth sensor 130 is an infrared sensor, which includes a cover 131, an emitter 132, and a receiver 133. The cover 131 is formed with a pair of light-permitting openings 134 corresponding to the emitter 132 and the receiver 133. One of the light-permitting openings 134 allows the emitter 132 to output infrared externally of the cover 131. The other light-permitting opening 134 allows the reflected infrared to be received by the receiver 133 internally of the cover 131.

As shown in FIG. 2, one end of the receiver 133 adjacent to one of the light-permitting holes 134 is bent toward the emitter 132. Such configuration maximizes the receiving area and the angle for the receiver 133 to receive reflected infrared.

FIG. 2 further illustrates a protrusion 135 formed between the light-permitting openings 134 on the cover 131. In particular, the protrusion 135 extends from a surface flushed with the light-permitting openings 134. The protrusion 135 serves to isolate the emitter 132 and the receiver 133 from each other, so as to prevent the receiver 133 from receiving emitted infrared directly without reflection. The isolation allows the light-permitting openings 134 to be radially maximized, in order to increase the luminous flux off the emitter 132 and reflected influx to the receiver 133. The above configuration enhances detection precision and flexibility.

Figure 4:
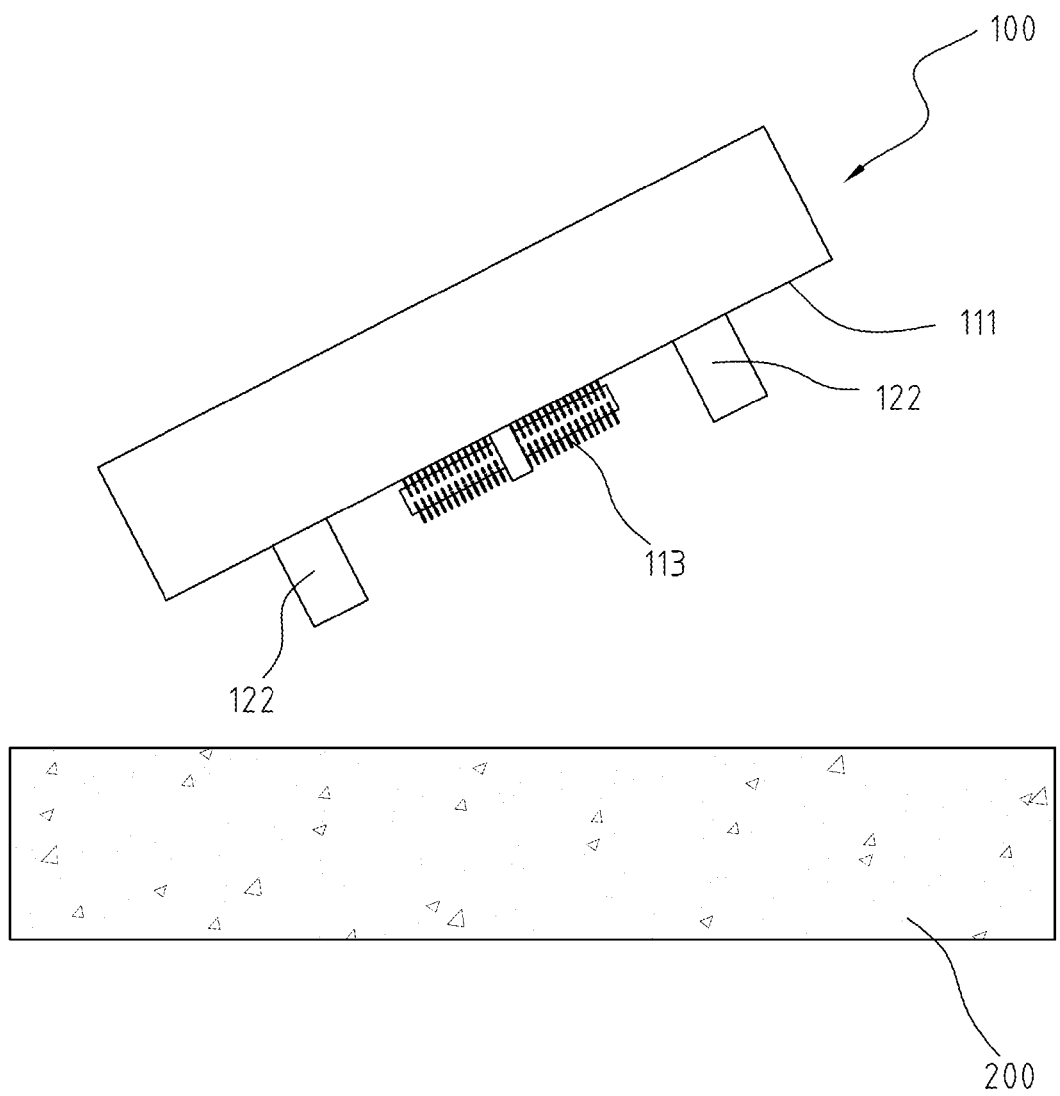
FIG. 4 is a schematic view showing the lifted state for the first embodiment of the instant disclosure.
Figure 5:
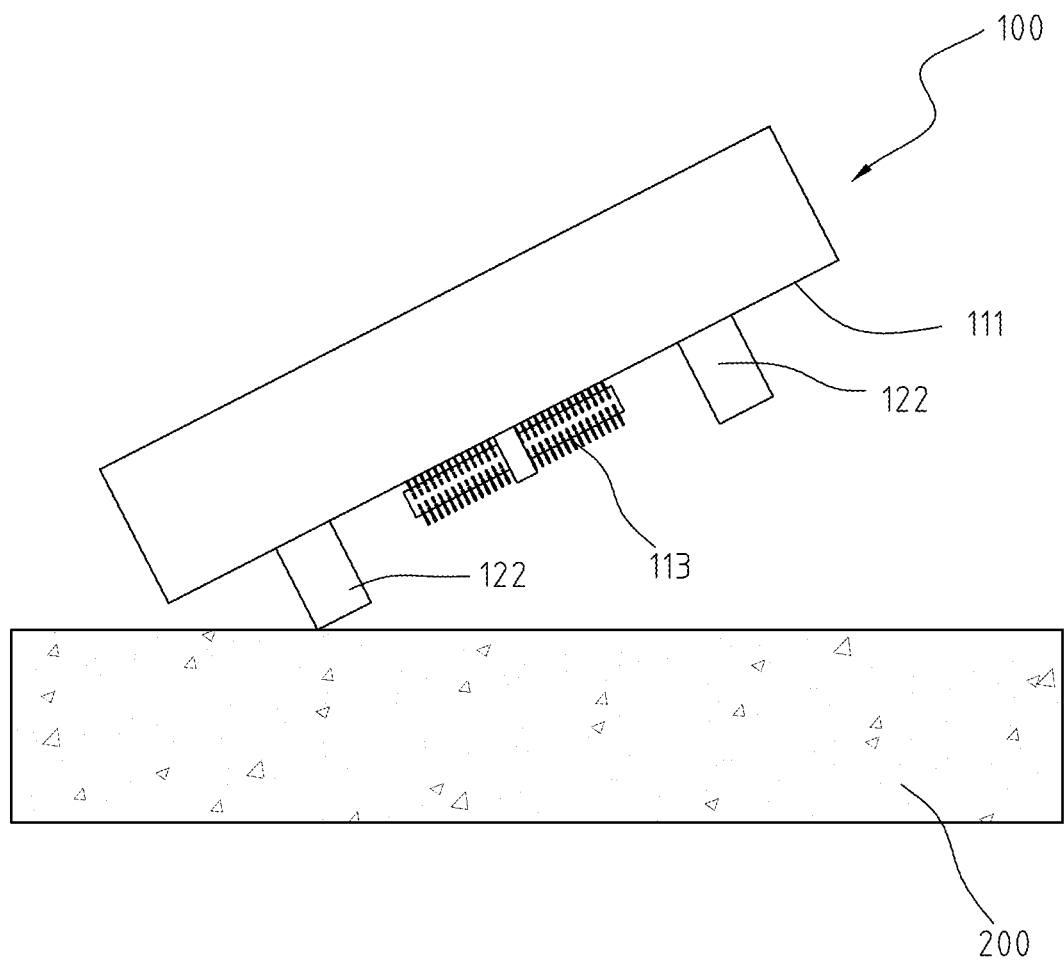
FIG. 5 is a schematic view showing the tilted state for the first embodiment of the instant disclosure.
Figure 6:
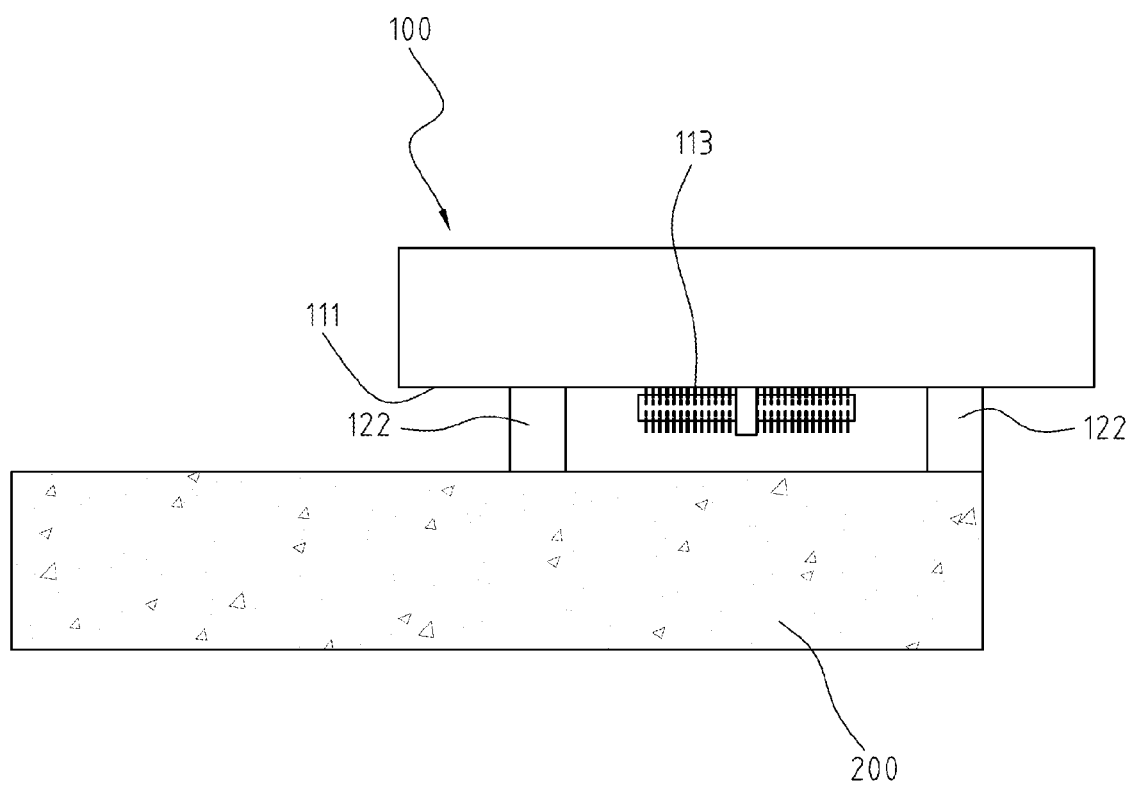
FIG. 6 is a schematic view showing the edge-bordering state for the first embodiment of the instant disclosure.

Now please refer to FIG. 3, which shows a block diagram for the robot 100 further having a control module 140. The control module 140 can be a processor of embedded type. The control module 140 electrically connects the moving unit 120 and the depth sensor 130. Based on the numerical value of the detection signal of the receiver 133 (i.e., electrical signal generated by the optical-electrical conversion of the reflected infrared), the control module 140 determines whether the robot 100 is in the lifted state, the tilted state, or the edge-bordering state. Particularly, the numerical value and the distance between the depth sensor 130 and a support surface 200 (FIGS. 4-6) are negatively correlated for determining the state of the robot 100. FIGS. 4-6 are discussed in details below to describe the three states of the robot 100.

FIG. 4 shows the lifted state for the robot 100, in which the robot 100 is lifted from the support surface 200. The support surface 200 may be a ground surface, a table surface, etc. The lifted state means not one part of the robot 100 is in touch with the support surface 200. For example, when a child lifts up the robot 100, the robot 100 is suspended off the support surface 200.

Please refer to FIG. 5, which shows the tilted state of the robot 100 with one end thereof suspended off the support surface 200. However, another end of the robot 100 is in contact with the support surface 200. In particular, the right side of the robot 100 is suspended off the support surface 200, while the left side thereof touches the support surface 200.

The edge-bordering state is shown in FIG. 6, as can be seen when the robot 100 is at the edge of the support surface 200. For instance, the robot 100 moves to the edge of a step.

Figure 7:
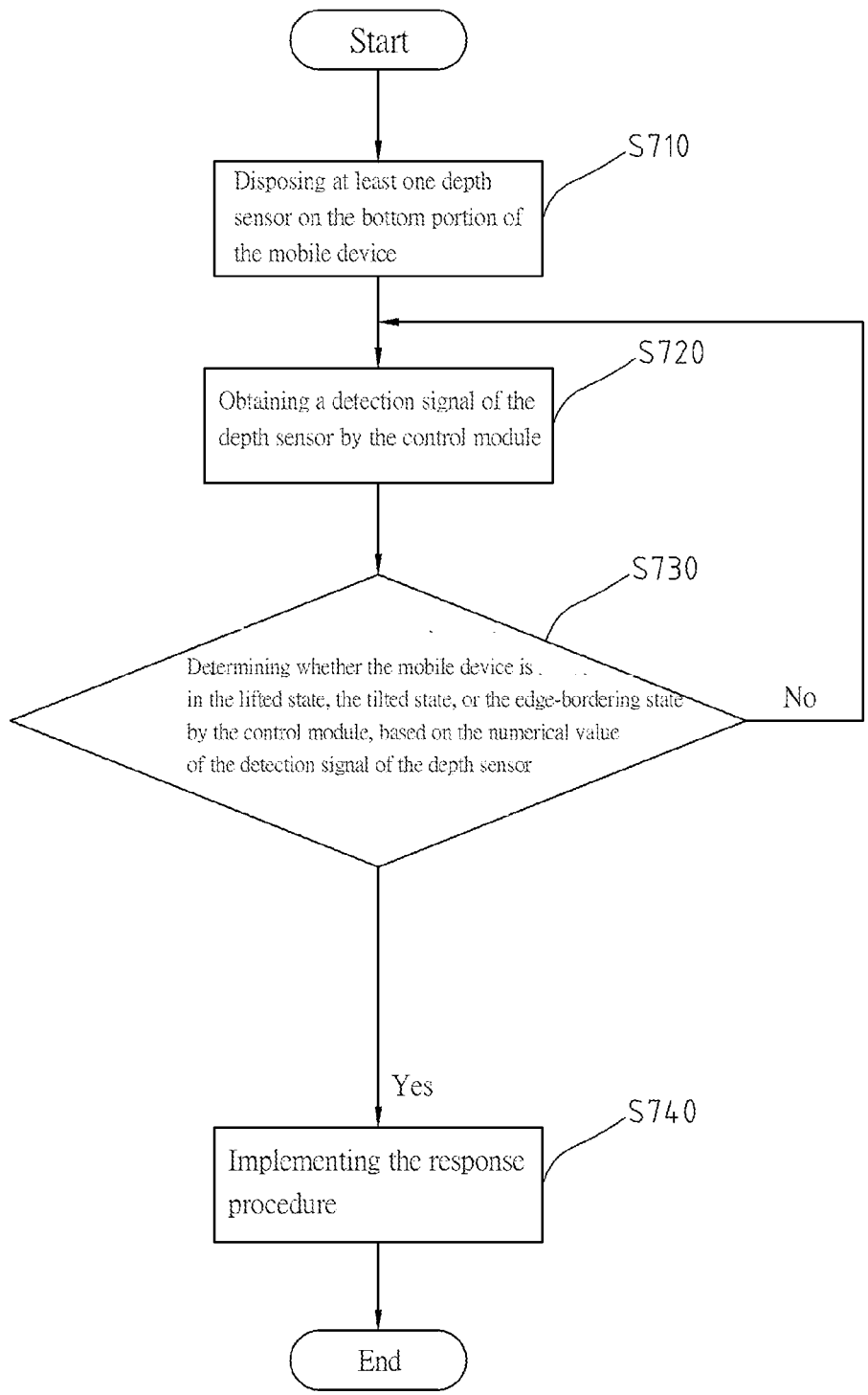
FIG. 7 is a flow chart of a state detection method for the first embodiment of the instant disclosure.

Next, FIG. 7 shows a flow chart for a state detection method for the first embodiment of the instant disclosure. This method is performed by the aforementioned control module 140. First, at least one depth sensor 130 is disposed on one side of the mobile device (step S710). The mobile device may be a self-propelled device like a robot. For the present embodiment, the mobile device is the robot 100. In other cases, the mobile devices may be mobile phones or other portable devices.

In step S720, the control module 140 obtains a detection signal of the depth sensor 130.

In step S730, based on the numerical value of the detection signal, the control module 140 determines whether the mobile device is in the lifted state, the tilted state, or the edge-bordering state. If the mobile device is in any of the above-mentioned states, the method will proceed to step S740, which will implement a response procedure. If not, the method will return to step S720 for continuing detection by the depth sensor 130. The response procedure referred herein may include any of the following features. First, the mobile device is put into a different motion, such as powering off or switch to standby mode, to stop the current motion of the mobile device, so the child would not be injured by the continuous motion of the mobile device. Other attribute is reducing power consumption by the mobile device. The mobile device can also be instructed to turn around from its original direction or trek backward, in order to change its current motion or exit from its current state. Secondly, the response procedure can issue a warning, to alert the user to get the mobile device out of its current state. The third option is to make the mobile device return to its original location or previous state, so the mobile device can exit from any of the abovementioned states. The response procedure is executed by the control module 140 based on switching between different software operations like interrupting, polling, threading, etc.

Figure 8:
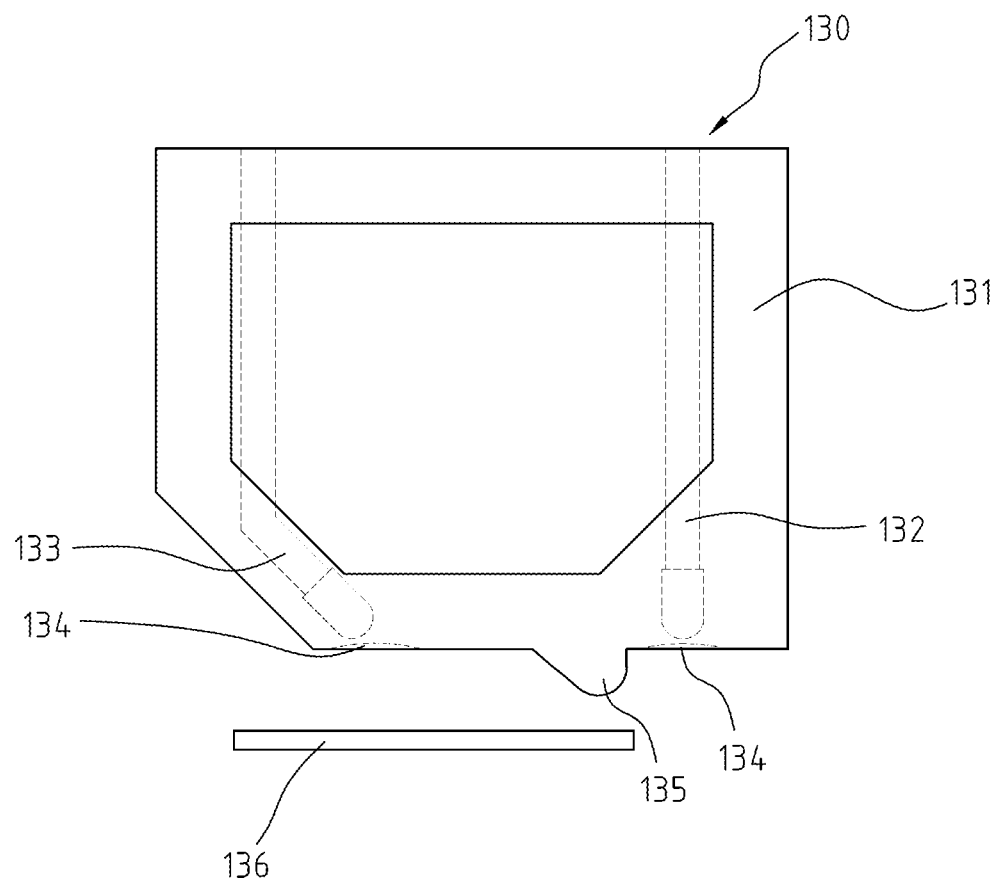
FIG. 8 is another schematic view of the depth sensor in FIG. 2.

In FIG. 8, another schematic view of the depth sensor 130 is shown. This depth sensor 130 differs from the one in FIG. 2 by having a shield 136. The shield 136 is connected to the cover 131 by a flexible member (e.g., spring). The shield 136 is disposed in front of the receiver 133. When the robot 100 is hit on the bottom portion thereof, the shield 136 would be displaced toward the receiver 133, so as to block the light from entering the light-permitting opening 134 corresponding to the receiver 133. As suggested by the description, the shield 136 provides covering and blocking functions. Thus, when a collision occurs, the numerical value of the detection signal of the depth sensor 130 would be zero or close to zero. Once the collision state has been detected, any of the aforementioned response procedures can be carried out accordingly. For the present scenario, the protrusion 135 also serves to block and limit the movement of the shield 136.

In other embodiment, the shield 136 can be arranged in front of the emitter 132. When a collision occurs, the shield 136 would block the infrared output by the emitter 132.

For another embodiment, the depth sensor 130 further includes an on/off switch (not shown), which is disposed between the cover 131 and the shield 136. The purpose is that when the shield 136 is displaced toward the cover 131, the shield 136 would actuate the switch. By connecting electrically to the switch, when the control module 140 receives the triggering signal of the switch, a collision state is determined to have occurred.

Figure 9:
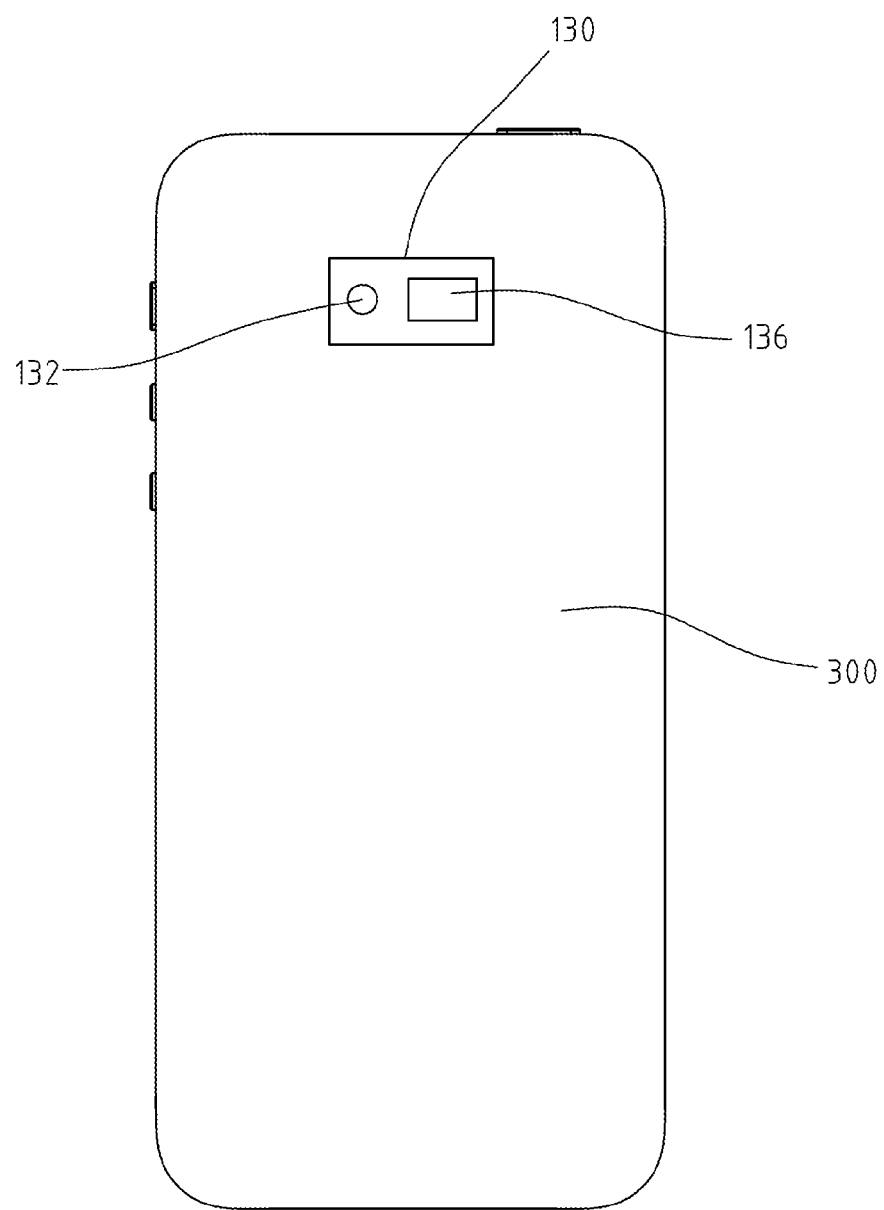
FIG. 9 is a schematic view of a mobile device for the first embodiment of the instant disclosure.

FIG. 9 shows a mobile device 300 for the first embodiment of the instant disclosure. For the present scenario, the mobile device 300 is a cellular phone, with the depth sensor 130 shown in FIG. 8 being disposed on the back surface thereof. Under the collision state (i.e., the back surface of the cellular phone is facing toward and disposed on the support surface), the aforementioned first response procedure is implemented. In other words, the cellular phone is powered off or put in standby mode, so as to save power consumption.

Please refer back to FIG. 3. The robot 100 can further include a warning module 150 electrically connected to the control module 140. The warning module 150 can issue a warning to execute the aforementioned second response procedure. Also, for different types of warning, the warning module 150 can be made up by different parts. For example, if the warning is provided in audio mode, the warning module 150 can be a speaker or a buzzer. When the warning is provided in lighting mode, the warning module 150 can be an indicator light or a display. Alternatively, if the warning is in a message form, the warning module 150 may be a mobile communication module or a wireless internet module. Thus, a warning message can be sent to a designated device (e.g., cell phone or computer) of the user. The warning may last for a period of time before terminating automatically. Another option may be the warning would be on continuously until being terminated by the user. For example, the robot 100 has a disarm button (not shown) for pressing by the user to terminate the warning.

In some embodiments, if the third type response procedure is employed, and based on the detection signal provided by the depth sensor 130, the state detection method can covert the detection signal into an image. The before and after images are then compared to identify the moving direction of and distance traveled by the mobile device. By using the obtained data, the travelling path of the mobile device can be stored. Accordingly, the robot 100 can further have a storage module 160, such as a memory unit, memory card, hard disk, etc. As illustrated in FIG. 3, the storage module 160 is electrically connected to the control module 140. When the mobile device intends to return to its original location, the control module 140 can read the travelling path saved in the storage module 160. Based on the recorded travelling path, the control module 140 can guide the moving unit 120 in trekking back to the original location. For the present scenario, the original location is an electric charging station or a starting location.

In another embodiment, after the robot 100 has returned to its previous state, the robot 100 can change its state again proactively or passively, such as moving toward another direction.

Figure 10:
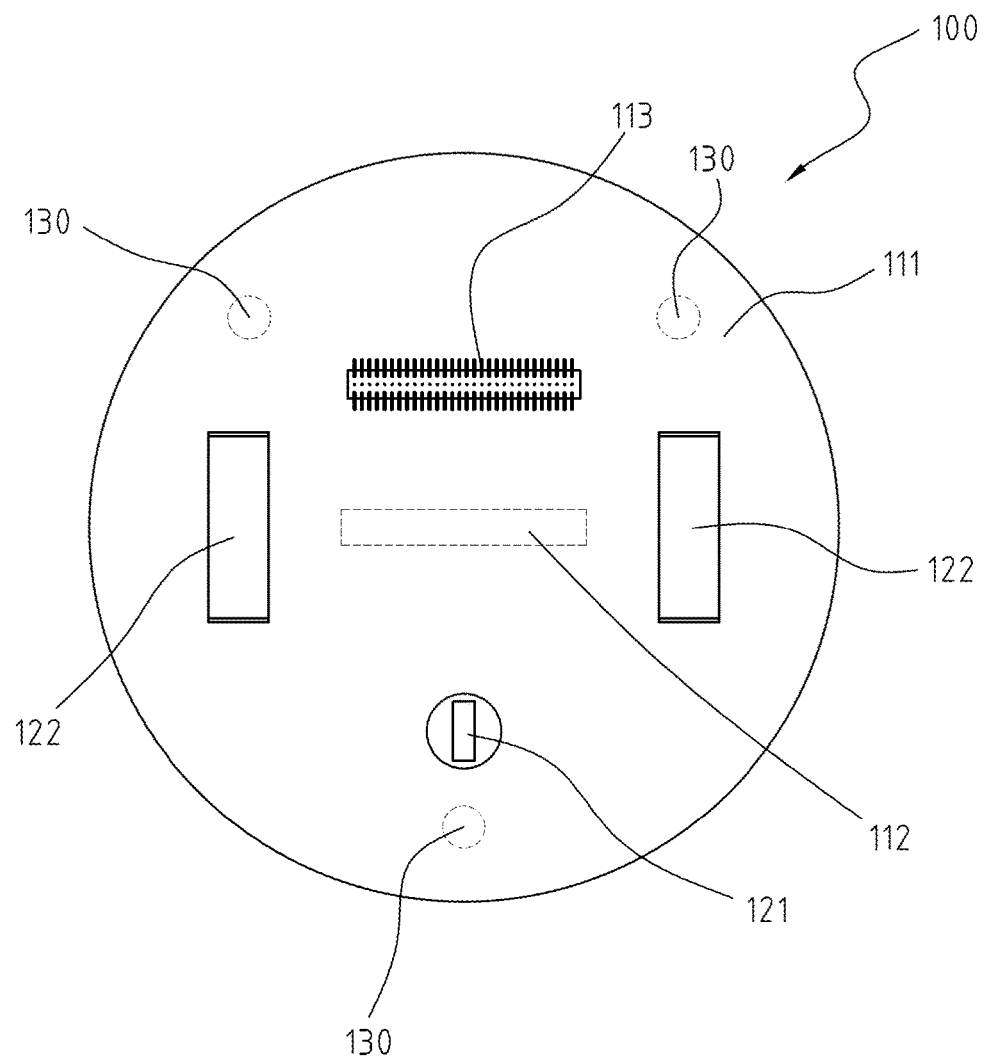
FIG. 10 is a top view of the robot for a second embodiment of the instant disclosure.

For a second embodiment of the robot 100 for the instant disclosure, please refer to FIG. 10, which shows a top view of the robot 100. The present embodiment differs from the first embodiment in that the robot 100 has three depth sensors 130 substantially evenly distributed on the bottom portion thereof. More detailed description of the embodiment having a multiplicity of depth sensors 130 is provided below.

Figure 11:
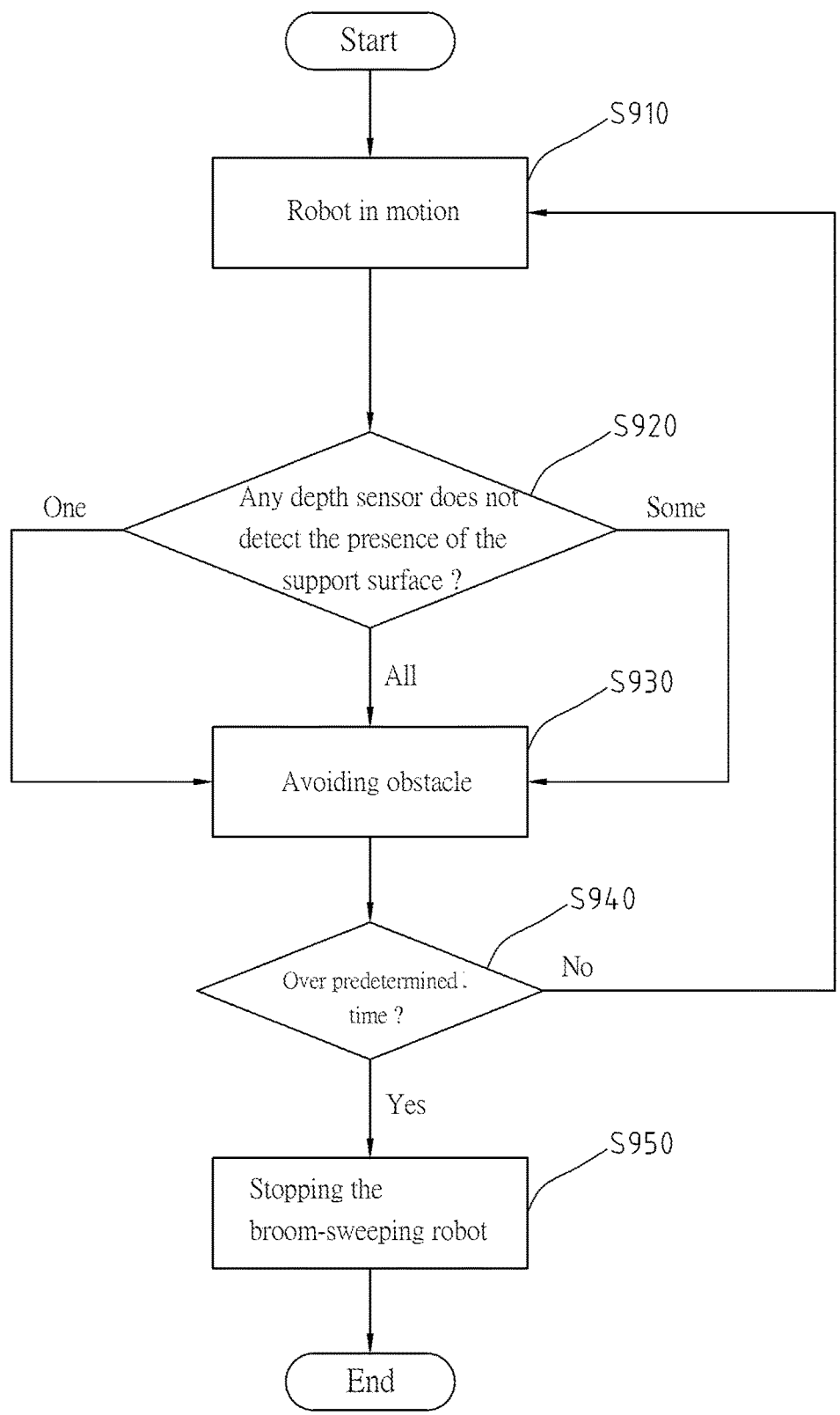
FIG. 11 is a flow chart for the state detection method for the second embodiment of the instant disclosure.

Please refer to FIG. 11, which shows a first flow chart of the state detection method for the second embodiment. The detection process is carried out while the robot 100 is in motion. In step S910, the robot 100 starts to move. Then, the control module 140 determines if any of the three depth sensors 130 does not indicate the presence of the support surface 200 (step S920). If at least one depth sensor 130 does not detect the support surface 200, the method proceeds to step S940. In step S940, the control module 140 determines whether a predetermined time period has passed with the support surface 200 going undetected. If yes, the robot 100 is determined to be in lifted or tilted state and its current motion must be stopped (step S950). If no, the state detection process returns to step S910. Please note, step S930 is between step S920 and step S940. Step S930 is for the robot 100 to avoid any obstacle if encountered upon.

Figure 12:
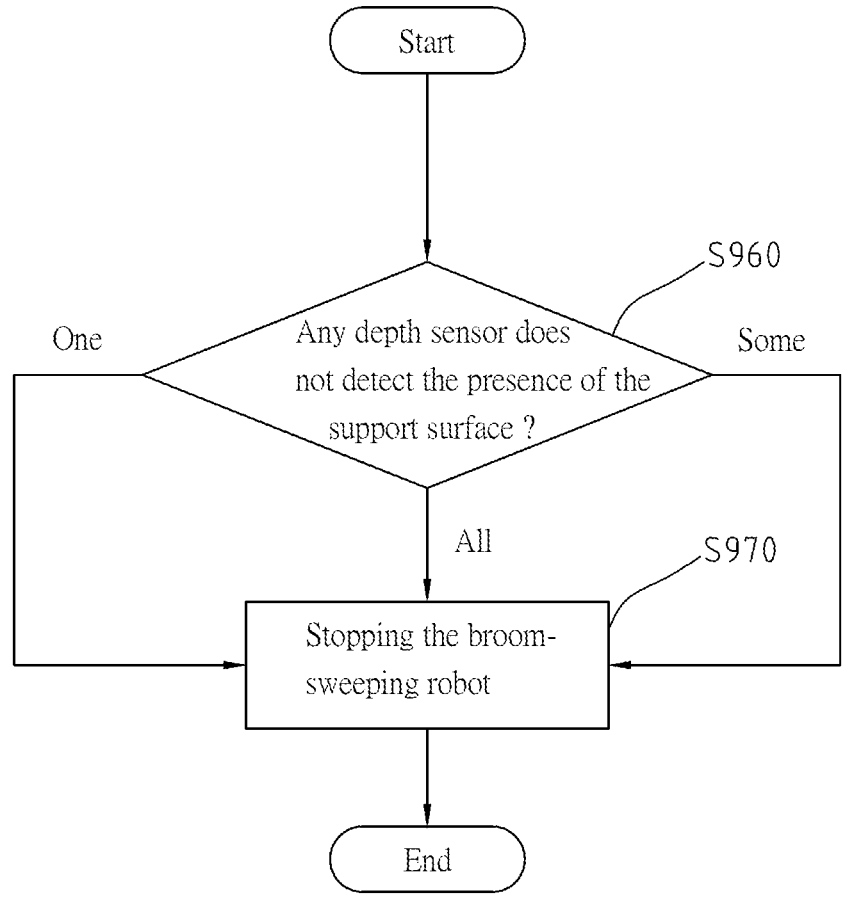
FIG. 12 is another flow chart for the state detection method for the second embodiment of the instant disclosure.

FIG. 12 shows a second flow chart for the state detection method for the second embodiment of the instant disclosure. Unlike the first flow chart, the present detection process is implemented while the robot 100 is still. For step S960, the control module 140 determines if any of the three depth sensors 130 does not detect the presence of the support surface 200. If at least one of the depth sensors 130 does not detect the support surface 200, the robot 100 is determined to be in the lifted state or the tilted state, and the detection process must proceed to step S970. In step S970, the robot 100 is stopped from its current operation.

The determination of whether any depth sensor 130 has detected the presence of the support surface 200 is based on if the changes of numerical value for the detection signals surpass a threshold value. For example, if the robot 100 is in the lifted or the tilted state, at least one depth sensor 130 would not be able to receive reflected infrared. A resulting change in the numerical value of the detection signal would be over the threshold value. Thus, when the changes in magnitude of detection signals for all depth sensors 130 surpass a first threshold value, the robot 100 is determined to be in the lifted state. When the changes in magnitude of detection signals for some depth sensors 130 surpass a second threshold value, with the detection signals for the rest of the depth sensors 130 do not change, the robot 100 is determined to be in the tilted state. When the changes in magnitude of detection signals for some depth sensors 130 surpass a third threshold value greater than the second threshold value, with the detection signals for the rest of the depth sensors 130 remain constant, the robot 100 is determined to be in the edge-bordering state.

Based on the above, the instant disclosure provides a state detection method, a robot 100, and a mobile device 300. At least one depth sensor 130 is employed to identify if the robot 100 or the mobile device 300 is in the lifted state, the tilted state, the collision state, or the edge-bordering state. No complex sensing instruments are needed to achieve the above purpose. After any of the four abovementioned states has been identified, the appropriate response procedure is implemented, in order to limit the motion or adjust the internal state or procedure of the system for the robot 100 or the mobile device 300.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for detecting a state of a mobile device, comprising:
   disposing a plurality of depth sensors on a side surface of the mobile device;
   obtaining detection signals of the depth sensors; and
   determining whether the mobile device is in a lifted state, a tilted state, or an edge-bordering state based on a numerical value of each of the detection signals, wherein the lifted state is defined as the mobile device being suspended off a support surface, the tilted state is defined as one of two ends of the mobile device being suspended off the support surface with the other end of the mobile device contacting the support surface, and the edge-bordering state is defined as the mobile device being adjacent to the edge of the support surface, wherein when a change in the detection signal for some of the depth sensors surpasses a second threshold value, while the rest of the detection signals keep unchanged, the mobile device is determined to be in the tilted state, and when the change in the detection signal for some of the depth sensors surpasses a third threshold value greater than the second threshold value, while the rest of the detection signals keep unchanged, the mobile device is determined to be in the edge-bordering state.

2. The method of claim 1, wherein when the change in the detection signal for each of the depth sensors surpasses a first threshold value, the mobile device is determined to be in the lifted state.

3. The method of claim 1, further comprising: changing a motion of the mobile device when the mobile device is in the lifted state, the tilted state, or the edge-bordering state.

4. The method of claim 1, further comprising: issuing a warning when the mobile device is in the lifted state, the tilted state, or the edge-bordering state.

5. The method of claim 1, further comprising: enabling the mobile device to return to an original location or a previous state, when the mobile device is in the lifted state, the tilted state, or the edge-bordering state.

6. The method of claim 1, further comprising:
   obtaining a moving direction and a travelling distance of the mobile device, based on the detection signals of the depth sensors; and
   recording a travelled path of the mobile device, based on the moving direction and the travelling distance of the mobile device.

7. The method of claim 1, further comprising:
   disposing a shield in front of each of the depth sensors; and
   detecting the detection signals of the depth sensors, wherein if the numerical value of one of the detection signals is zero, the mobile device is determined to be in a collision state.

8. A robot, comprising:
   a main body;
   a moving unit disposed on the underside of the main body;
   a plurality of depth sensors disposed on a side surface of the main body; and
   a control module electrically connected to the moving unit and the depth sensors, for determining if the robot is in a lifted state, a tilted state, or an edge-bordering state, based on a numerical value of a detection signal of each of the depth sensors, wherein the lifted state is defined as the robot being suspended off a support surface, the tilted state is defined as one of two ends of the robot being suspended off the support surface with the other end of the robot contacting the support surface, and the edge-bordering state is defined as the robot being adjacent to the edge of the support surface, wherein when a change in the detection signal for some of the depth sensors surpasses a second threshold value, while the rest of the detection signals keep unchanged, the robot is determined to be in the tilted state, and when the change in the detection signal for some of the depth sensors surpasses a third threshold value greater than the second threshold value, while the rest of the detection signals keep unchanged, the robot is determined to be in the edge-bordering state.

9. A mobile device, comprising:
   a main body;
   a plurality of depth sensors disposed on a side surface of the main body; and
   a control module electrically connected to the depth sensors, for determining if the mobile device is in a lifted state, a tilted state, or an edge-bordering state, based on a numerical value of a detection signal of each of the depth sensors, wherein the lifted state is defined as the mobile device being suspended off a support surface, the tilted state is defined as one of two ends of the mobile device being suspended off the support surface with the other end of the mobile device contacting the support surface, and the edge-bordering state is defined as the mobile device being adjacent to the edge of the support surface, wherein when a change in the detection signal for some of the depth sensors surpasses a second threshold value, while the rest of the detection signals keep unchanged, the mobile device is determined to be in the tilted state, and when the change in the detection signal for some of the depth sensors surpasses a third threshold value greater than the second threshold value, while the rest of the detection signals keep unchanged, the mobile device is determined to be in the edge-bordering state.

* * * * *